United States Patent
Ignaczak et al.

(10) Patent No.: US 9,858,821 B2
(45) Date of Patent: Jan. 2, 2018

(54) AUTONOMOUS VEHICLE PASSENGER LOCATOR

(71) Applicant: Ford Global Technologies, LLC, Dearborn, MI (US)

(72) Inventors: Brad Alan Ignaczak, Canton, MI (US); Cynthia M. Neubecker, Westland, MI (US); Adil Nizam Siddiqui, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/054,707

(22) Filed: Feb. 26, 2016

(65) Prior Publication Data

US 2017/0249846 A1    Aug. 31, 2017

(51) Int. Cl.
| | |
|---|---|
| G06K 9/00 | (2006.01) |
| G08G 1/00 | (2006.01) |
| B64C 39/02 | (2006.01) |
| G05D 1/00 | (2006.01) |
| G01S 19/03 | (2010.01) |
| H04N 5/232 | (2006.01) |

(52) U.S. Cl.
CPC ........... G08G 1/202 (2013.01); B64C 39/024 (2013.01); G01S 19/03 (2013.01); G05D 1/0027 (2013.01); G06K 9/00288 (2013.01); G08G 1/205 (2013.01); B64C 2201/12 (2013.01); B64C 2201/141 (2013.01); H04N 5/232 (2013.01)

(58) Field of Classification Search
USPC ......... 701/2, 3, 22, 23; 455/404.2; 340/5.52, 340/5.53
See application file for complete search history.

(56) References Cited

U.S. PATENT DOCUMENTS 5,812,067 A * 9/1998 Bergholz ............... B60R 25/04
                                                              180/257
2007/0126561 A1    6/2007 Breed
(Continued)

FOREIGN PATENT DOCUMENTS

| DE | 2007046270 A1 | 4/2009 |
|---|---|---|
| DE | 2012013239 A1 | 3/2013 |

OTHER PUBLICATIONS

Skycall, http://senseable.mit.edu/skycall/ published: Sep. 15, 2013, (last accessed Mar. 20, 2017).*

*Primary Examiner* — Richard Goldman
(74) *Attorney, Agent, or Firm* — Frank A. MacKenzie; Bejin Bieneman PLC

(57) ABSTRACT

A system of one or more computers configured to perform particular operations or actions by virtue of having software, firmware, hardware, or a combination of them installed on the system that in operation causes or cause the system to perform the actions. One general aspect includes a first computer having a processor and a memory, the memory storing instructions executable by the processor such that the first computer is programmed to send parameters describing a target passenger to a mobile drone. The system instructs said drone to circumnavigate an area while searching said area for the target passenger with an image capturing device. The system receives communications from the drone and confirms a match to the target passenger and instructs the drone to guide the target passenger to a destination.

18 Claims, 3 Drawing Sheets

(56) References Cited

U.S. PATENT DOCUMENTS

| | | | |
|---|---|---|---|
| 2012/0150364 A1* | 6/2012 | Tillotson | G05D 1/101 701/3 |
| 2014/0316614 A1* | 10/2014 | Newman | G06Q 30/0611 701/3 |
| 2015/0081169 A1 | 3/2015 | Pisz | |
| 2015/0142211 A1* | 5/2015 | Shehata | H04N 7/181 701/2 |
| 2015/0336667 A1* | 11/2015 | Srivastava | B64C 39/024 701/2 |
| 2015/0370251 A1* | 12/2015 | Siegel | G05D 1/0027 701/2 |
| 2016/0016663 A1* | 1/2016 | Stanek | B60R 16/02 701/3 |
| 2016/0023762 A1* | 1/2016 | Wang | B64F 1/00 701/3 |
| 2016/0027292 A1* | 1/2016 | Kerning | G08B 25/10 455/404.2 |
| 2016/0031559 A1* | 2/2016 | Zang | G05D 1/0038 701/2 |
| 2016/0072771 A1* | 3/2016 | Krietzman | H04L 63/0861 705/14.73 |
| 2016/0132052 A1* | 5/2016 | Seydoux | G05D 1/0022 701/2 |
| 2016/0214713 A1* | 7/2016 | Cragg | B64C 39/024 |
| 2016/0287937 A1* | 10/2016 | Fitzgerald | G06K 9/00342 |
| 2016/0345260 A1* | 11/2016 | Johnson | H04W 52/0209 |
| 2016/0376031 A1* | 12/2016 | Michalski | B64F 1/36 701/15 |
| 2017/0011333 A1* | 1/2017 | Greiner | G06Q 10/083 |
| 2017/0053169 A1* | 2/2017 | Cuban | G06K 9/00664 |

* cited by examiner

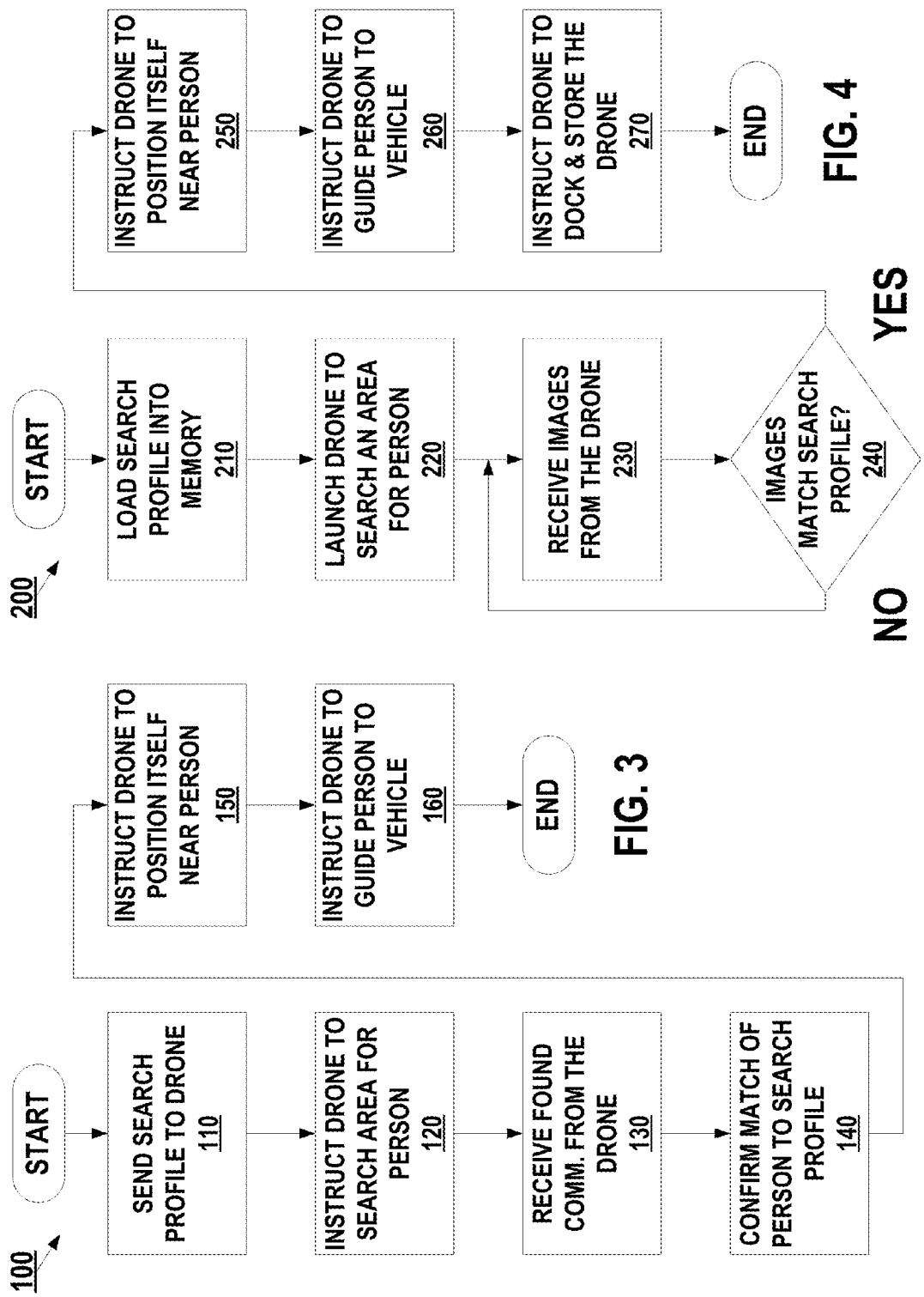

AUTONOMOUS VEHICLE PASSENGER LOCATOR

BACKGROUND

As vehicles shift toward having autonomous driving capability, there can be situations in which a vehicle is dispatched to pick up a passenger. Such situations could require locating the target passenger. Difficulties in passenger location can make it difficult and time consuming for the autonomous vehicle and target passenger to rendezvous. Systems such as a vehicle-mounted video system with facial recognition have deficiencies, e.g., may not be usable to identify the passenger due to a blocked line of sight.

BRIEF DESCRIPTION OF THE DRAWINGS

FIG. 3 is a flowchart of a first exemplary process that may be implemented by the vehicle's computer to locate a passenger.

FIG. 4 is a flowchart of a second exemplary process that may be implemented by the vehicle's computer to locate a passenger.

DETAILED DESCRIPTION

As disclosed herein, a flying drone can position itself a few meters from the vehicle and search through a crowd of people in the rendezvous area. The drone can also transmit images of the passenger and surroundings to the vehicle, where the images could be stored and/or transmitted to a third party for a visual verification, for example, a parent who dispatched the vehicle.

The drone device can also can establish a radio frequency connection, for example, a Bluetooth or Wi-Fi connection with the passenger's cellular telephone or wearable device to relay information between the vehicle, the drone and the passenger.

Figure 1:
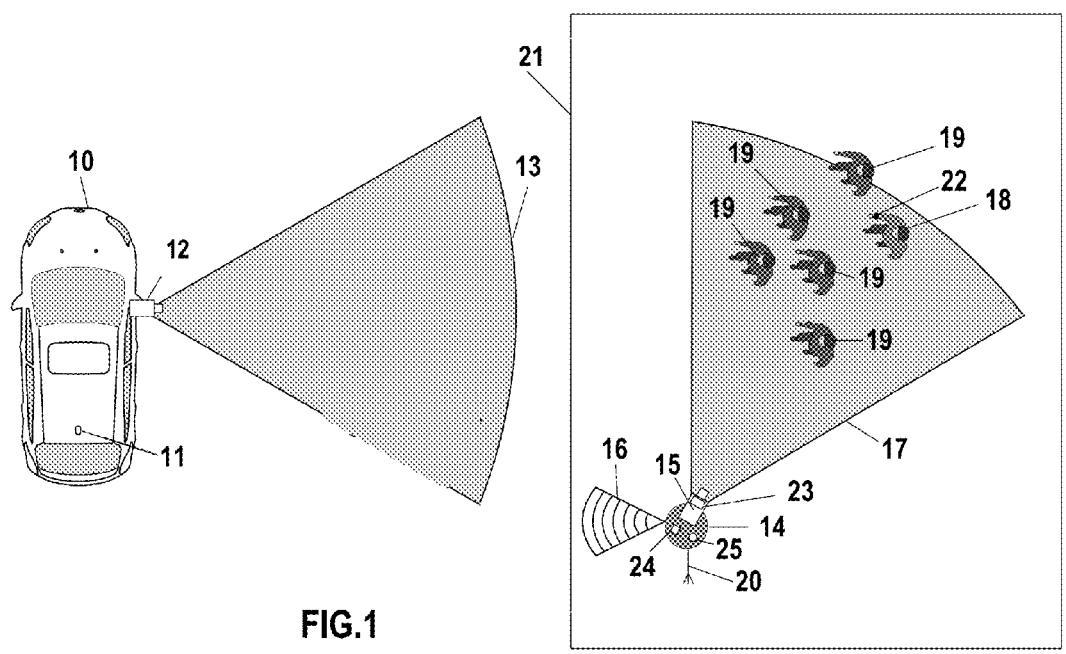
FIG. 1 is block diagram of an exemplary deployment of a drone dispatched from a vehicle to locate a passenger in a crowd of people.

Now turning to the Figures, wherein like numerals indicate like parts throughout the several views, FIG. 1 is block diagram of an exemplary passenger locator system 5 that includes an exemplary deployment of a passenger locator drone 14 which may be dispatched from a vehicle 10 to locate a target passenger 18 in a crowd of people 19. The vehicle 10 is equipped with a communications antenna 11 to accommodate communications with the drone 14. The communications antenna 11 can include one or more antennas such as are known, and can also include the antenna array for the vehicle 10 Global Navigation Satellite System (GNSS) or Global Positioning System (GPS) and the antenna for a cellular network communication, for example, voice and data for the vehicle 10. Additionally, the communications antenna 11 can provide for any other Radio Frequency (RF) communication devices, for example a Vehicle to Vehicle (V2V) communications device or Vehicle to Infrastructure (V2I) communications device.

The vehicle 10 may also have a camera 12 attached to the vehicle, for example, a right lane mirror camera which can also be utilized to locate a passenger 18. However, the camera 12 field of view 13 is limited to the immediate surrounding area of the vehicle 10.

The vehicle 10 includes a search computer unit (SCU) 8, which has at least one processor and memory to store computer instructions executable on the at least one processor such that the computer is programmed to carry out various operations, including as disclosed herein. The memory can also store data, register values and temporary and permanent variables, etc., as is known. The executable instructions include one or more predetermined criteria for command and control of the drone along with facial and body identification algorithms. The SCU 8 may also contain or have an additional special processor, such as an imaging processor or a digital signal processor (DSP) to aid the processor with signal interpretation. The SCU 8 is communicatively coupled to a telematics control unit 9 and to the camera 12, e.g., via a vehicle communications bus or other vehicle network such as is known.

The telematics control unit 9 can be connected to the GNSS and the GPS unit and provides an interface for external communication, for example, with a GSM network, a GPRS network, a LTE network, a Wi-Fi network or a Bluetooth network. The telematics control unit 9 can include a processor, for example, a microcontroller and memory to store computer instructions, register values and temporary and permanent variables.

The drone 14 can be either a ground drone or an unmanned aerial vehicle, for example, a quadcopter, a hexcopter, a helicopter, a fixed wing or any aircraft capable of autonomous or semiautonomous flight. A ground drone is an unmanned ground vehicle that does not leave the surface of the earth. The drone 14 has an imaging capture device, for example, a drone camera 15 which the drone 14 uses to capture images of the passenger 18 and of the other people 19.

The drone 14 has a RF communication 16 link with the vehicle 16 for command and control of the drone 14 via a drone antenna 20. The drone antenna can also facilitate communications with the passenger 18, for example, the drone 14 can establish a drone to passenger communications link to a wearable device 22, for example, a cellular phone device on the passenger 18 via Wi-Fi protocol, Bluetooth protocol, Near Field Communications (NFC) protocol or any two way RF communications protocol.

The drone 14 can additionally have a light signal 23 to get the attention of the passenger 18, an aural signal generator 24, for example, a bell, a microphone 25, a global navigation satellite system (GNSS) and a radio frequency transceiver for the above cited communications link 16. The light signal 23 can be, e.g., a spot light, a flood light, a strobe light, etc.

The drone 14, can be programmed to search a drone search area 21 in a systematic way using the drone camera 15. The drone camera field of view 17 can only visualize a portion of the drone search area 21 and may have to take several passes over the drone search area 21 until the passenger 18 is found.

Figure 2:
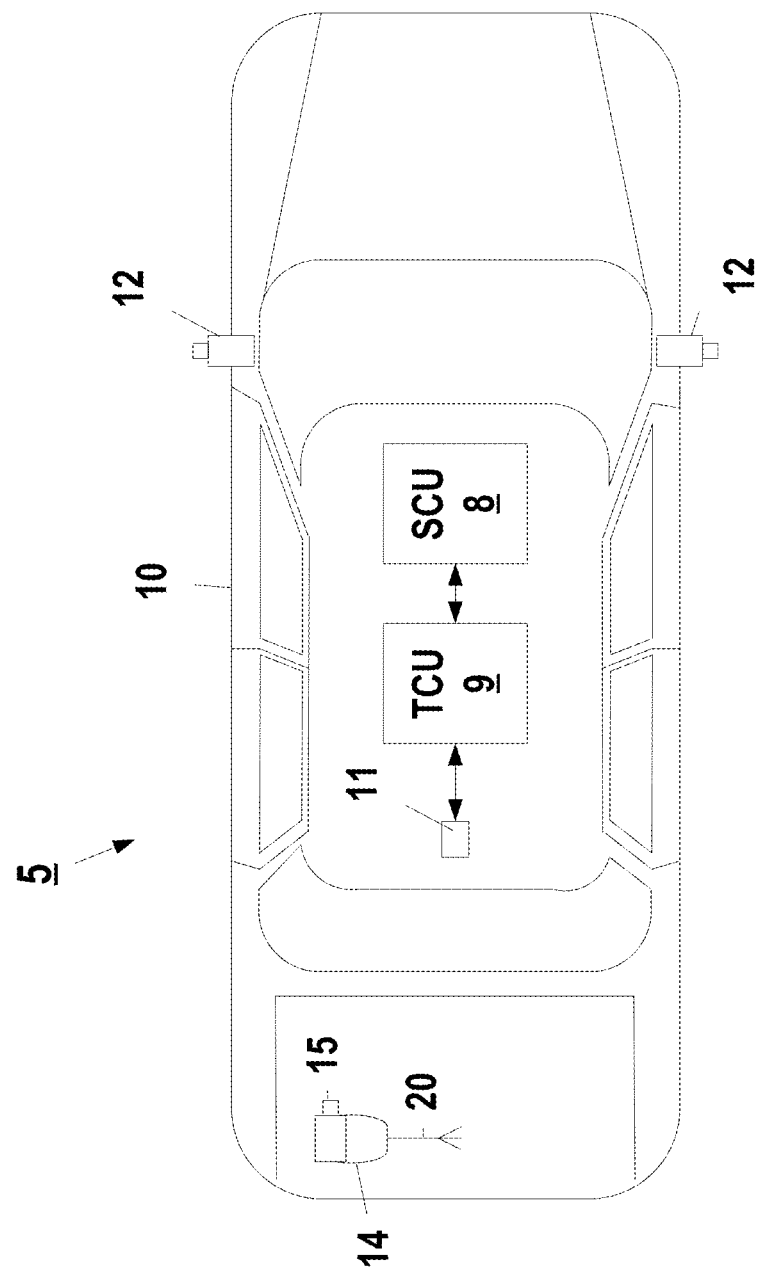
FIG. 2 is a block diagram of an exemplary docking of the drone on the vehicle before or after deployment.

FIG. 2 shows the drone 14 docked on the rear of the vehicle 10 either before or after a search mission to locate the passenger 18. The drone 14 can, alternatively, be stowed in the trunk or hatch of the vehicle 10, or even be an on demand drone which is already at the pick-up location. The vehicle 10 can initiate the search for the passenger while enroute by contacting the pick-up location and requesting the use of the drone 14.

Once the vehicle is either in a designated pick-up area or close to the pick-up area, the vehicle can provide the drone with an image of the likeness of the passenger 18, and launch the drone. The drone can mingle amongst the people 19 if the drone 14 is a ground drone or, if aerial, the drone 14 can fly or hover over the people 19 and search for the passenger 18.

The drone 14 can merely send images of the people 19 back to the vehicle 10 and the vehicle SCU 8 can process the images and detect the passenger 18 or, alternatively or additionally, the drone 14 can process the images in a drone processor, which may include programming for image recognition to detect the passenger 18. Once the passenger 18 has been detected, the SCU 8 can first instruct the drone 14 to message the passenger 18 that the passenger 18 has been detected. The message can be aural, a spot light, a flood light or a strobe light illuminated upon the passenger 18, a text message to a wearable device 22, for example, a cellular phone device of the passenger 18, or some other form of message. The drone 14 can be programmed to either hover or circle above the passenger 18 and guide the passenger 18 to a destination, for example, the vehicle 10, or alternatively if the drone 14 is a ground drone, the drone can simply lead the passenger to the vehicle 10.

To verify the identity of the passenger 18, the SCU 8 can send an image of the passenger 18 to a human being for a positive visual identification. For example, a parent may have sent the vehicle to pick up their child at the airport. The image of the passenger 18 the drone 14 took with its camera 15 can be sent via the telematics control unit 9 to the dispatching parent for the positive visual identification. Once confirmed, the SCU 8 can unlock the doors of the vehicle 10 and let the passenger 18 into the vehicle 10.

Process Flows

FIG. 3 is a flow chart illustrating an exemplary process 100 of the SCU 8 commanding and controlling an image capable search and identify drone device which can identify a target passenger and guide the passenger back to an autonomous vehicle.

The process 100 begins in a block 110, in which a search profile, i.e., parameters describing a target passenger to be located, is uploaded to the drone 14. If the drone 14 performs some or all of the imaging processing on board the drone, the drone 14 computer will be provided with a set of a set of facial recognition parameters or a set of physical characteristics of the passenger 18, i.e., that may be used according to known image recognition techniques, along with a set of coordinates of a search area. The facial characteristics can include the relative position, size, and/or shape of the eyes, nose, cheekbones, and jaw, just to name a few. The drone 14 will match the facial characteristics of the crowd of people 19 until the drone finds the passenger 18.

Next in a block 120, the drone 14 is deployed; for example, if the drone 14 is stored in or on the vehicle 10, the vehicle 10 will launch the drone 14, e.g., according to instructions form the SCU 8. Alternatively, if the drone is pre-parked at an airport terminal, for example, the SCU 8 will send a launch command to the pre-parked drone at the airport terminal along with the facial characteristics and the search area.

Next, in a block 130, the vehicle 10 SCU 18 receives a "match-found" communication from the drone 14, indicating that the drone 14 has determined it has a high confidence that the drone 14 has located the passenger 18, for example, by matching the uploaded facial characteristics with a person in the search area.

Next, in a block 140, the match profile can be confirmed, for example, the SCU 8 can place a telephone call or send a text to the passenger 18 and request that the passenger signal the drone 14, for example, by waving, responding to a text message, or displaying a confirmation QR code the SCU 8 has sent to the passenger 18 mobile device. A QR code, abbreviated from Quick Response Code, is type of matrix barcode. It is a machine-readable optical label that contains information about the item to which it is displayed. A QR code uses four standardized encoding modes including numeric, alphanumeric, byte/binary, and kanji to efficiently store and represent data.

Next, in a block 150, the SCU 8 instructs the drone 14 to position itself near the passenger 18, for example, if the drone 14 is a hovercraft, such as a quad or multicopter, the drone 14 can be instructed to hover over or just in front of the passenger 14 or if the drone 14 is a fixed wing aircraft, the drone 14 can circle above the passenger 18. Alternatively, if the drone 14 is a ground drone, the drone 14 can be instructed to position itself next to the passenger 18.

Next, a block 160, the SCU 8 instructs the drone 14 to guide the passenger to the vehicle 10 and the process 100 ends.

Now turning to FIG. 4, the process 200 begins in a block 210, in which a search profile is uploaded to the memory of the drone 14 and into the memory of the SCU 8. The drone search profile includes a set of coordinates of the search area. When deployed in the process 200, the drone 14 will send images, such as a video feed or still pictures of the crowd of people 19 and the passenger 18, but not perform image recognition. The SCU 18 will perform the imaging processing at the vehicle 10.

Next in a block 220, the drone 14 is deployed; for example, if the drone 14 is stored in the vehicle 10, the vehicle 10 will launch the drone 14. Alternatively, if the drone is pre-parked at an airport terminal, for example, the vehicle 10 will send a launch command to the pre-parked drone at the airport terminal along with the search area to be covered.

Next, in a block 230, which can follow in the block 220 or in a block 240, the vehicle 10 SCU 18 receives and processes the images from the drone 14

Next, in the block 240, the SCU 8 determines whether an image match of the search profile has been determined. If there is a match, the process proceeds to a block 250, else the process returns to in the block 230.

Next, in the block 250, the SCU 8 instructs the drone 14 to position itself near the passenger 18, as like in the block 150 from FIG. 3, if the drone 14 is a hovercraft, such as a quad or multicopter, the drone 14 can be instructed to hover over or just in front of the passenger 14 or if the drone 14 is a fixed wing aircraft, the drone 14 can circle above the passenger 18. Alternatively, if the drone 14 is a ground drone, the drone 14 can be instructed to position itself next to the passenger 18.

Next, a block 260, the SCU 8 instructs the drone 14 to guide the passenger to the vehicle 10

Next in the block 270, the SCU 8 instructs the drone 14 to return to it stored and docked position and the process 200 ends.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising a first computer having a processor and a memory, the memory storing instructions executable by the processor such that the first computer is programmed to:

send image characteristics describing a target passenger to a mobile drone;

instruct the drone to deploy from a vehicle and to circumnavigate an area while searching the area for the target passenger with an image capturing device;

receive a communication including image data from the drone;

confirm that the image data matches the target passenger image characteristics; and instruct the drone to guide the target passenger to the vehicle.

2. The system of claim 1, wherein the target passenger image characteristics include facial recognition parameters.

3. The system of claim 1, wherein the drone is programmed to traverse through the area and hover over the area.

4. The system of claim 1, wherein the first computer further receives, in the communication, a video feed from the drone.

5. The system of claim 1, wherein the drone includes a second computer that is programmed to:

determine a match of an image received by the imaging capture device to the target passenger image characteristics; and send a match-found communication to the first computer.

6. The system of claim 1, wherein the drone includes a second computer programmed to cause the drone to provide one or more of a light signal, an aural signal, a microphone output, a global navigation satellite system (GNSS) output and a radio frequency transceiver output.

7. The system of claim 6, wherein the light signal is at least a strobe light, a spot light and a flood light.

8. The system of claim 6, wherein the radio frequency transceiver is capable of at least a Bluetooth®, a Wi-Fi, a near field communication (NFC) and a cellular network communication.

9. The system of claim 6, wherein the target passenger has a wearable device capable of at least a Bluetooth, a Wi-Fi, a NFC and a cellular network communication.

10. A method, comprising:

sending image characteristics describing a target passenger to a mobile drone;

instructing the drone to deploy from a vehicle to circumnavigate an area while searching the area for the for the target passenger with an image capturing device;

receiving a communication including image data from the drone;

confirming that the image data matches the target passenger image characteristics;

instructing the drone to position itself proximate to the first person; and instructing the drone to guide the target passenger to the vehicle.

11. The method of claim 10, wherein the target passenger image characteristics include facial recognition parameters.

12. The method of claim 10, wherein the drone is programmed to traverse through at least the area and hover over the area.

13. The method of claim 10, further comprising receiving a video feed from the drone.

14. The method of claim 10, further comprising:

determining a match of an image received by the imaging capture device to the target passenger image characteristics; and sending a match-found communication to a first computer.

15. The method of claim 10, wherein the drone includes a second computer programmed to cause the drove to provide one or more of a light signal, an aural signal, a microphone, a global navigation satellite system (GNSS) and a radio frequency transceiver.

16. The method of claim 15, wherein the light signal is at least a strobe light, a spot light and a flood light.

17. The method of claim 15, wherein the radio frequency transceiver is capable of at least a Bluetooth®, a Wi-Fi, a near field communication (NFC) and a cellular network communication.

18. The method of claim 15, wherein the target passenger has a wearable device capable of at least a Bluetooth, a Wi-Fi, a NFC and a cellular network communication.

* * * * *